United States Patent
McLellan et al.

(10) Patent No.: US 6,903,304 B1
(45) Date of Patent: Jun. 7, 2005

(54) PROCESS FOR DRESSING MOLDED ARRAY PACKAGE SAW BLADE

(75) Inventors: Neil McLellan, Danville, CA (US); Chun Ho Fan, Sham Tseng (HK); Geraldine Tsui Yee Lin, Tung Tau Est (HK); John Ping Sheung Lau, Wong Tai Sin (HK)

(73) Assignee: Asat Ltd., Tsuen Wan (HK)

( * ) Notice: Subject to any disclaimer, the term of this patent is extended or adjusted under 35 U.S.C. 154(b) by 74 days.

(21) Appl. No.: 10/660,612

(22) Filed: Sep. 12, 2003

(51) Int. Cl.[7] .............................................. B23K 26/00
(52) U.S. Cl. .............................. 219/121.69; 219/121.85
(58) Field of Search ....................... 219/121.69, 121.85, 219/121.67, 121.68, 121.82

(56) References Cited

U.S. PATENT DOCUMENTS

| | | | |
|---|---|---|---|
| 4,488,882 A * | 12/1984 | Dausinger et al. ............. 51/295 |
| 4,776,251 A * | 10/1988 | Carter, Jr. ..................... 83/835 |
| 6,229,200 B1 | 5/2001 | Mclellan et al. ............. 257/666 |
| 6,413,150 B1 | 7/2002 | Blair ............................ 451/41 |
| 6,422,229 B1 | 7/2002 | Padrinao et al. .............. 125/25 |
| 2003/0199165 A1 * | 10/2003 | Keenan et al. .............. 438/689 |

* cited by examiner

*Primary Examiner*—M. Alexandra Elve
(74) *Attorney, Agent, or Firm*—Keating & Bennett, LLP

(57) ABSTRACT

A process for reworking or dressing a saw blade used in wafer dicing and singulation of molded array integrated circuit packages, includes rotating the saw blade on a spindle and ablating an edge portion of the saw blade using a laser and thereby dressing the saw blade.

7 Claims, 2 Drawing Sheets

PROCESS FOR DRESSING MOLDED ARRAY PACKAGE SAW BLADE

FIELD OF THE INVENTION

The present invention relates in general to saw singulation of integrated circuit packages, and more particularly to a process for dressing saw blades used in singulating molded array packages.

BACKGROUND OF THE INVENTION

Integrated circuit (IC) packages are commonly gang fabricated in the form of an array as several plastic packages are fabricated on a leadframe array or substrate that incorporates a plurality of leadframe or substrate units. There are several advantages associated with gang fabrication, including decreased labor, time, cost for fabrication and efficiency of materials used in fabrication. After gang fabrication, the individual IC packages are singulated using a conventional wafer saw.

One particular process for fabricating a leadless plastic chip carrier IC package is disclosed in U.S. Pat. No. 6,229,200, the contents of which are incorporated herein by reference. During this process, an array of leadless plastic chip carriers are fabricated by mounting singulated semiconductor dice to respective die attach pads of the leadframe strip, followed by wire bonding from the semiconductor dice to respective contacts and encapsulating in a molding compound. The leadframe strip is then mounted to a wafer saw ring or presented on a precision truck table, and saw-singulated.

In other packages, such as chip scale packages (CSP), IC devices are arrayed in a pattern on the surface of a substrate and the packages are diced into single units using a saw blade.

It will be appreciated that accuracy and precise control during dicing or saw singulation is important to ensure package uniformity and reliability.

Conventional saw blades are generally circular, or disk-shaped and include a bore hole at the center of the saw blade for mounting the blade between a pair of flanges, on a spindle of a cutting machine. The saw blades are comprised of an abrasive material embedded in a softer matrix material and are generally referred to as diamond cutting wheels. Typically, the abrasive material is an industrial-grade diamond embedded in a metallic binder material.

With repeated dicing and saw singulation of molded array packages, the diamond cutting wheels wear and the sharp cutting edges of the wheels break down leading to a change in shape and contour of the cutting surfaces of the wheels. Break down of the cutting wheels causes increased loading of the wheels, imprecise and inaccurate singulation and dicing and increased heat generation during cutting, thereby imparting damage to the IC packages. Imprecise and inaccurate singulation results in IC packages with undesirable profiles and affects package body dimension and subsequent handling of the package. For example, precision pick and place tooling requires precise package profile and body dimension. Changes to the package profile and body dimension affect the accuracy and consistency of performance of the pick and place tooling.

In prior art fabrication processes, diamond cutting wheels are replaced when wheel wear is excessive in order to obviate IC package damage caused by wheel wear. The diamond cutting wheels, however, are relative costly and it is desirable to extend the life of the diamond cutting wheel to reduce cost.

SUMMARY OF THE INVENTION

In one aspect of the present invention, there is provided a process for reworking or dressing a saw blade. The process includes rotating the saw blade on a spindle and ablating an edge portion of the saw blade using a laser to thereby dress the saw blade.

In another aspect of the present invention, there is provided a process for reworking or dressing a saw blade used in wafer dicing and singulation of molded array integrated circuit packages. The process includes rotating the saw blade on a spindle and ablating an edge portion of the saw blade using a high energy laser and thereby dressing the saw blade.

In another aspect, there is provided a process for reworking a saw blade used in wafer dicing and singulation of molded array IC packages. The process includes mounting the saw blade on a spindle in a dressing device, rotating the saw blade on the spindle, and feeding the saw blade into a laser beam for removing an edge portion of the saw blade.

Advantageously, the use of the laser to ablate the edge of the wheel permits sharpening of the diamond wheel, also referred to as dressing, and the time of use of a diamond wheel is increased. A single diamond wheel can be dressed, or sharpened a plurality of times, thereby extending the wheel life.

BRIEF DESCRIPTION OF THE DRAWINGS

The invention will be better understood with reference to the following description and the drawings, in which like numerals denote like parts, and in which.

DETAILED DESCRIPTION OF THE PREFERRED EMBODIMENTS

Figure 1:
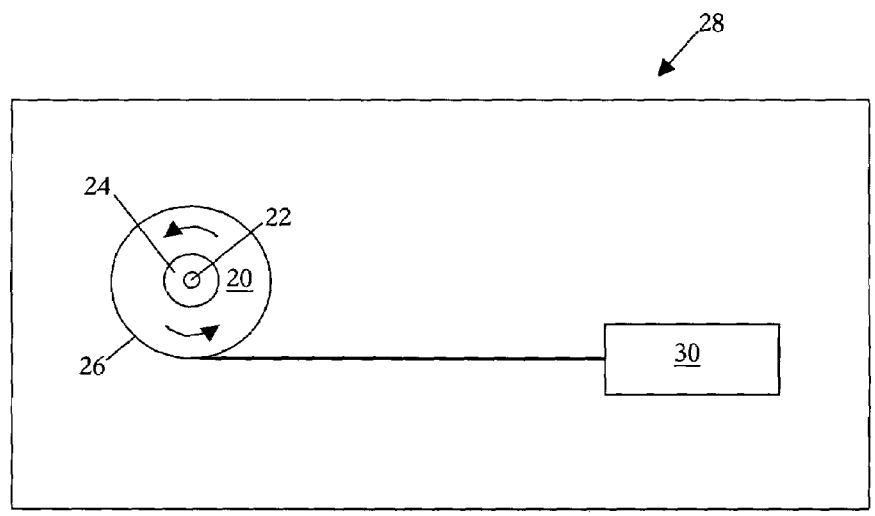
FIG. 1 is a plan view of a saw blade mounted between a pair of flanges on a spindle in a dressing device according to an embodiment of the present invention.

Reference is first made to FIG. 1 to describe a process for dressing a saw blade used in wafer dicing and singulation of molded array IC packages, according to an embodiment of the present invention. The process includes the steps of rotating a saw blade 20 on a spindle 22 and ablating an edge portion of the saw blade 20 using a laser, thereby dressing the saw blade 20.

Figure 2:
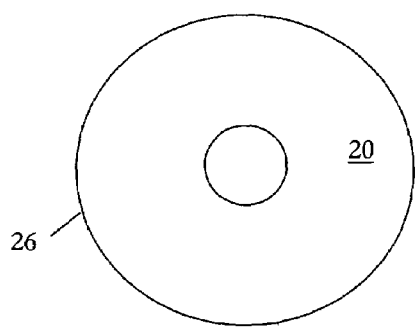
FIG. 2 is a front view of the saw blade of FIG. 1, removed from the spindle and flanges.

The process for dressing the saw blade 20 will now be more fully described. Referring now to FIG. 2, there is shown a front view of a saw blade 20, also referred to as a diamond cutting wheel. The saw blade 20 is disk-shaped and includes a bore hole in the center for mounting the saw blade 20. In the present embodiment the saw blade 20 is comprised of an industrial-grade diamond embedded in a metallic matrix.

Figures 3A, 3B, 3C:
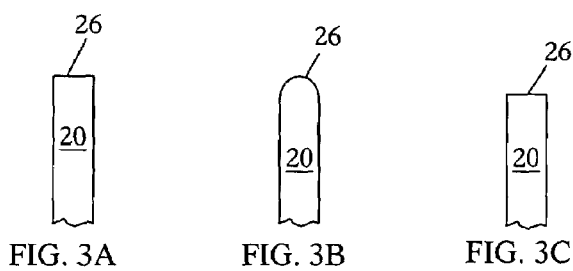
FIGS. 3A–3C show a portion of the saw blade of FIG. 2, in profile, in the new, worn and dressed conditions, respectively.

In use, the saw blade 20 is mounted between a pair of flanges 24 on the spindle 22, as shown in FIG. 1. A new saw blade 20 has a circumferential cutting edge 26 that is generally sharp and square, when viewed in profile, as shown in FIG. 3A. After repeated use in dicing or singulating of molded array packages, the saw blade 20 wears and the sharp cutting edge 26 breaks down causing the shape of the profile of the saw blade 20 to change. The sharp edges are worn away leaving a rounded profile of the cutting edge 26, as shown in FIG. 3B.

To mitigate the disadvantages caused by wear of the saw blade 20, the saw blade 20 and spindle 22 are removed from the wafer dicing or singulation apparatus and are placed in a dressing device, indicated generally by the numeral 28 in FIG. 1. When dressing (also referred to as reworking) begins, the saw blade 20 is rotated in the dressing device 28. The saw blade 20 and a laser source 30 are positioned relative to each other such that the laser emitted from the laser source 30 is aligned to strike the edge 26 of the saw blade 20 and to thereby ablate a portion of the saw blade 20. The cutting edge 26 of the saw blade 20 is dressed or reshaped to a sharp cutting edge 26, or square profile, as shown in FIG. 3C. It will be appreciated that the relative positions of the saw blade 20 and the laser source 30 and emitted laser, are closely controlled for accuracy when ablating the cutting edge 26.

In the present embodiment, the laser source 30 moves relative to the position of the saw blade 20 and is automatically controlled. The laser source 30 then marks the saw blade 20 with, for example, the numeral 1, to indicate that the saw blade has been dressed (or reworked). In an alternative embodiment, the saw blade 20 moves relative to the location of the laser source 30.

Clearly, each saw blade 30 can be reworked a plurality of times, thereby increasing the life of the saw blade 30. With each dressing, however, the diameter of the saw blade 30 is reduced. This dimension change in the saw blade 30 is accounted for in subsequent dicing and singulation operations.

Figure 4:
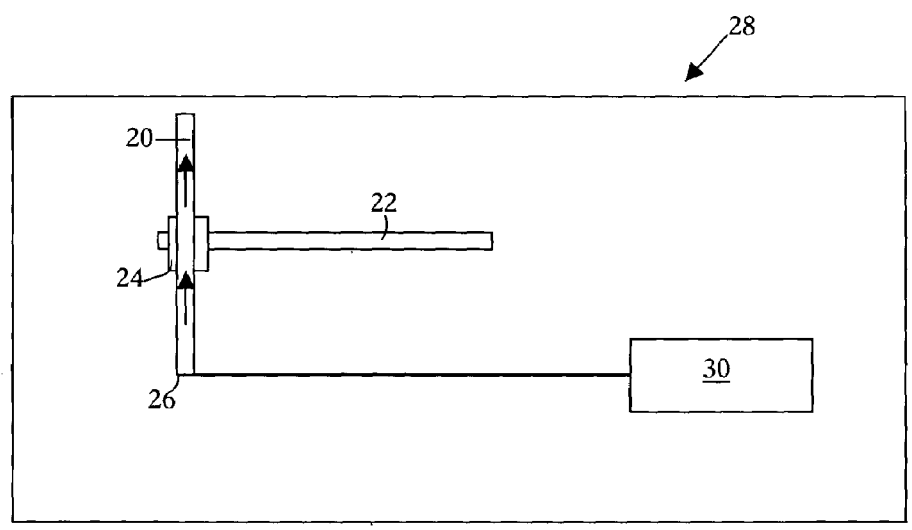
FIG. 4 is a plan view of a saw blade mounted between a pair of flanges on a spindle in a dressing device according to another embodiment of the present invention.

Referring to FIG. 4, an alternative arrangement of the saw blade 20 and the laser source 30 is shown. The saw blade 20 and the laser source 30 are positioned relative to each other such that the laser emitted from the laser source 30 strikes a portion of the saw blade 20 proximal the cutting edge 26.

Other embodiments and variations are possible, for example, the shape of the dressed blade can differ. Those skilled in the art may conceive of other embodiments and variations, all of which are believed to be within the scope and sphere of the present invention.

What is claimed is:

1. A process for dressing a saw blade, comprising:
   rotating the saw blade on a spindle; and
   ablating an edge portion of the saw blade using a laser thereby dressing said saw blade.

2. The process according to claim 1, wherein ablating said edge portion of the saw blade comprises ablating the edge portion of the saw blade using a high energy laser.

3. The process according to claim 1, further comprising marking the saw blade to indicate that said saw blade is dressed and to indicate the number of times the saw blade has been dressed.

4. A process for reworking a saw blade used in wafer dicing and singulation of molded array IC packages, the process comprising:
   mounting the saw blade on a spindle in a dressing device;
   rotating the saw blade on said spindle;
   feeding said saw blade into a laser beam for removing an edge portion of the saw blade.

5. The process according to claim 4, wherein feeding comprises feeding the saw blade into a high energy laser beam.

6. The process according to claim 4, further comprising marking the saw blade with an indicator to thereby indicate that the saw blade is reworked.

7. A process for dressing a saw blade used in wafer dicing and singulation of molded array IC packages, the process comprising:
   rotating the saw blade on a spindle; and
   ablating an edge portion of the saw blade using a high energy laser thereby dressing said saw blade.

* * * * *